United States Patent
Liao et al.

(10) Patent No.: US 8,670,198 B1
(45) Date of Patent: Mar. 11, 2014

(54) DATA SEQUENCE DETECTION IN BAND-LIMITED CHANNELS BASED ON EQUALIZATION INTERPOLATION

(71) Applicant: LSI Corporation, San Jose, CA (US)

(72) Inventors: Yu Liao, Longmont, CO (US); Hongwei Song, Longmont, CO (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/766,182

(22) Filed: Feb. 13, 2013

(51) Int. Cl.
*G11B 5/00* (2006.01)
(52) U.S. Cl.
USPC .............................................. 360/32; 360/65
(58) Field of Classification Search
None
See application file for complete search history.

(56) References Cited

U.S. PATENT DOCUMENTS

| | | | |
|---|---|---|---|
| 4,989,221 A | 1/1991 | Qureshi et al. | |
| 6,487,672 B1 | 11/2002 | Byrne et al. | |
| 6,584,145 B1 | 6/2003 | Camagna et al. | |
| 6,854,002 B2 | 2/2005 | Conway et al. | |
| 7,010,075 B2 | 3/2006 | Yamada | |
| 7,489,749 B2 | 2/2009 | Liu | |
| 8,149,529 B2 | 4/2012 | Mathew et al. | |
| 2007/0286270 A1 | 12/2007 | Huang et al. | |
| 2009/0316820 A1 | 12/2009 | Yang | |
| 2012/0089657 A1 | 4/2012 | Yang et al. | |
| 2013/0016846 A1 | 1/2013 | Tan et al. | |

*Primary Examiner* — Paul Huber
(74) *Attorney, Agent, or Firm* — Ryan, Mason & Lewis, LLP

(57) ABSTRACT

A method for detecting a data sequence includes generating a first sample stream, which is a time-sequenced digital signal associated with samples of an analog signal. The first sample stream is interpolated to generate a second sample stream with a different phase. The first sample stream is equalized to generate a first equalized sample stream. The second sample stream is equalized to generate a second equalized sample stream. The first and second equalized sample streams are processed to estimate the second equalized sample stream. The first equalized sample stream is filtered to generate a first set of noise sample streams. The estimated second equalized sample stream is filtered to generate a second set of noise sample streams. The first set and the second set of noise sample streams are diversity combined to generate a set of combined noise sample streams. A data sequence is detected using the combined noise sample streams.

22 Claims, 5 Drawing Sheets

500

DATA SEQUENCE DETECTION IN BAND-LIMITED CHANNELS BASED ON EQUALIZATION INTERPOLATION

FIELD OF THE INVENTION

The field generally relates to data sequence detection techniques and, in particular, to circuits and methods for implementing equalization interpolation for data sequence detection in band-limited channels, such as a read channel in a magnetic disk storage system.

BACKGROUND

Storage devices such as hard disk drives are used to provide non-volatile data storage in a wide variety of different types of data processing systems. A typical hard disk drive comprises a spindle that holds one or more flat circular storage disks, also referred to as platters. Each storage disk comprises a substrate made from a non-magnetic material, such as aluminum or glass, which is coated with one or more thin layers of magnetic material. In a magnetic storage system, a digital data sequence is written as a sequence of magnetic flux transitions onto the surface of the magnetic medium in concentric, radially spaced tracks at a predetermined baud rate. The sequence of magnetic flux transitions corresponding to the digital data sequence are written onto the surface of the magnetic medium with a read/write head coil. The digital data sequence serves to modulate current in the read/write head coil. When reading the recorded data from the magnetic medium, the read/write head passes over the surface of the magnetic medium and transduces magnetic flux transitions into pulses of alternating magnetic polarity in a continuous time analog read signal. These pulses are decoded by read channel circuitry to reproduce the digital data sequence. Within increasing data density, magnetic flux transitions are packed closer together on the magnetic medium. As a result, adjacent magnetic pulses begin to overlap with one another, causing distortions, generally known as intersymbol interference ("ISI"), in the read signal. ISI can lead to detection errors.

SUMMARY

In an embodiment of the invention, a method is provided for detecting a data sequence. The method includes generating a first sample stream, wherein the first sample stream is a time-sequenced digital signal associated with samples of an analog signal. The first sample stream is interpolated to generate a second sample stream, wherein the second sample stream has a phase that is different from a phase of the first sample stream. The first sample stream is equalized to generate a first equalized sample stream. The second sample stream is equalized to generate a second equalized sample stream. The first and second equalized sample streams are processed to estimate the second equalized sample stream. The first equalized sample stream is filtered to generate a first set of noise sample streams. The estimated second equalized sample stream is filtered to generate a second set of noise sample streams. The first set and second set of noise sample streams are diversity combined to generate a set of combined noise sample streams. A data sequence is detected using the set of combined noise sample streams.

Other embodiments of the invention will become apparent.

WRITTEN DESCRIPTION

Figure 1:
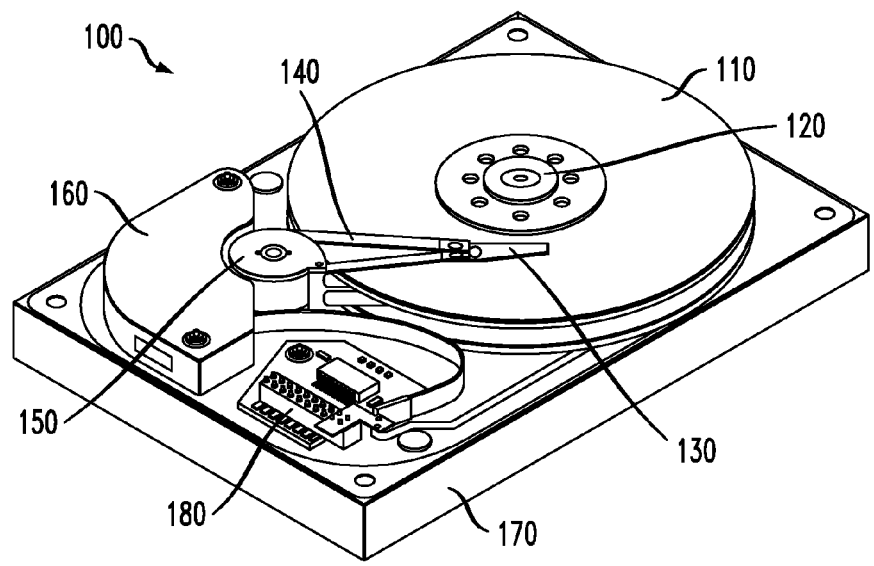
FIG. 1 shows a perspective view of a disk-based storage device according to an embodiment of the invention.

FIG. 1 shows a storage device 100 according to an embodiment of the invention. The storage device 100 comprises a hard disk drive that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor (not explicitly shown in FIG. 1) to spin the storage disk 110 at high speed. Data is read from and written to the storage disk 110 via a read/write head 130 that is mounted on a positioning arm 140. An actuator motor 150 (or voice coil motor) is connected to one end of the positioning aim 140 opposite the read/write head 130. The actuator motor 150 comprises a permanent magnet and a moving coil motor, which operate to controllably swing the read/write head 130 into a desired position across the magnetic surface of the storage disk 110 as the storage disk 110 spins by operation of the spindle motor. The storage device 100 further comprises an upper housing 160 which houses driver circuitry and other mechanical and electronic components for controlling the actuator motor 150 and the spindle motor. The upper housing 160 further comprises control circuitry such as preamplifier electronics that are mounted proximate to the pivot location of the actuator motor 150. Thin printed-circuit cables are used to connect the read/write heads 130 to the preamplifier electronics mounted in the housing 160.

The storage device 100 further comprises other control circuitry mounted on or more printed circuit boards that are disposed in a lower housing 170 of the storage device 100. The control circuitry comprises various drive electronics, signal processing electronics, and associated processing and memory circuitry, to control the writing and reading of data to and from the storage disk, as well as additional or alternative elements that are utilized to drive and control the spindle and actuator motors. A connector 180 is used to connect the storage device 100 to a host computer or other related processing device.

FIG. 1 shows an embodiment of the invention with one instance of each of the single storage disk 110, read/write head 130, and positioning arm 140. In an alternate embodiment of the invention, the storage device 100 comprises multiple instances of one or more of these or other drive components. For example, in an alternative embodiment of the invention, the storage device 100 comprises multiple storage disks attached to the same spindle such that each storage disk rotates at the same speed, as well as multiple read/write heads and associated positioning arms coupled to one or more actuators.

A read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. Such heads may comprise, for example, write heads with wrap-around or side-shielded main poles, or any other types of heads suitable for recording and/or reading data on a storage disk.

In addition, the storage device 100 as illustrated in FIG. 1 may include other elements in addition to, or in place of, those specifically shown, including one or more elements of a type commonly found in conventional storage devices. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
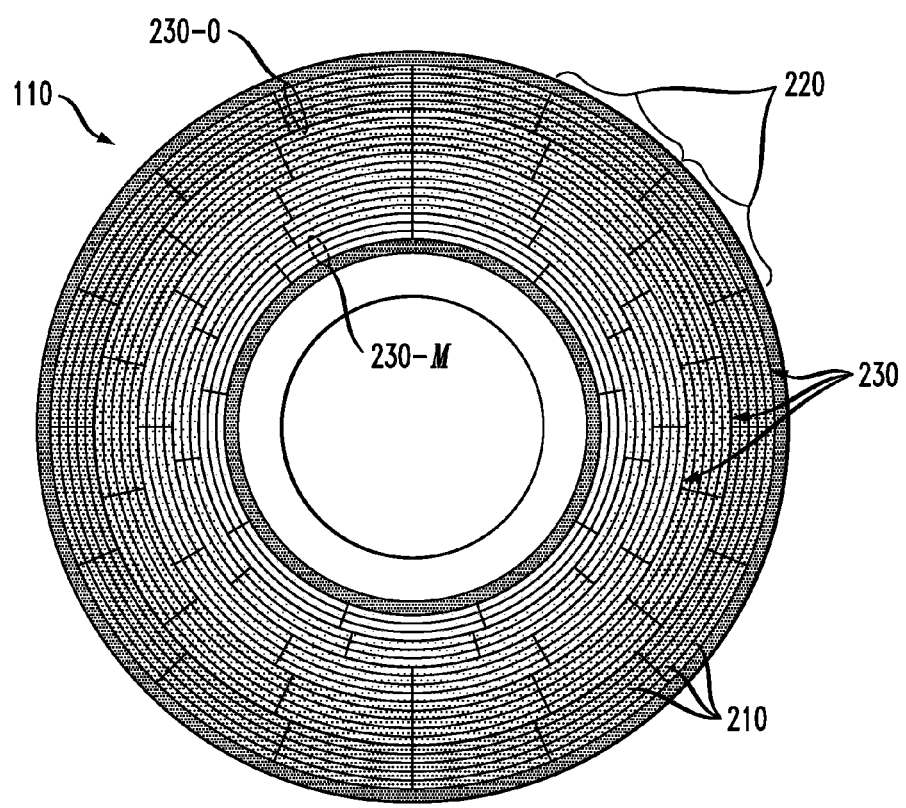
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 that are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head 130 is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment of the invention by more than a factor of two. For example, in one embodiment of the invention, the outermost annular zone may have a data transfer rate of approximately 2.3 Gigabits per second (Gb/s), while the innermost annular zone has a data transfer rate of approximately 1.0 Gb/s. In such an implementation, the hard disk drive may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner. SAMs may therefore be viewed as an example of what are more specifically referred to herein as servo marks. The particular data transfer rates and other features described above are presented for purposes of illustration only, and should not be construed as limiting in any way. A wide variety of other data transfer rates and storage disk configurations may be used in other embodiments.

Figure 3:
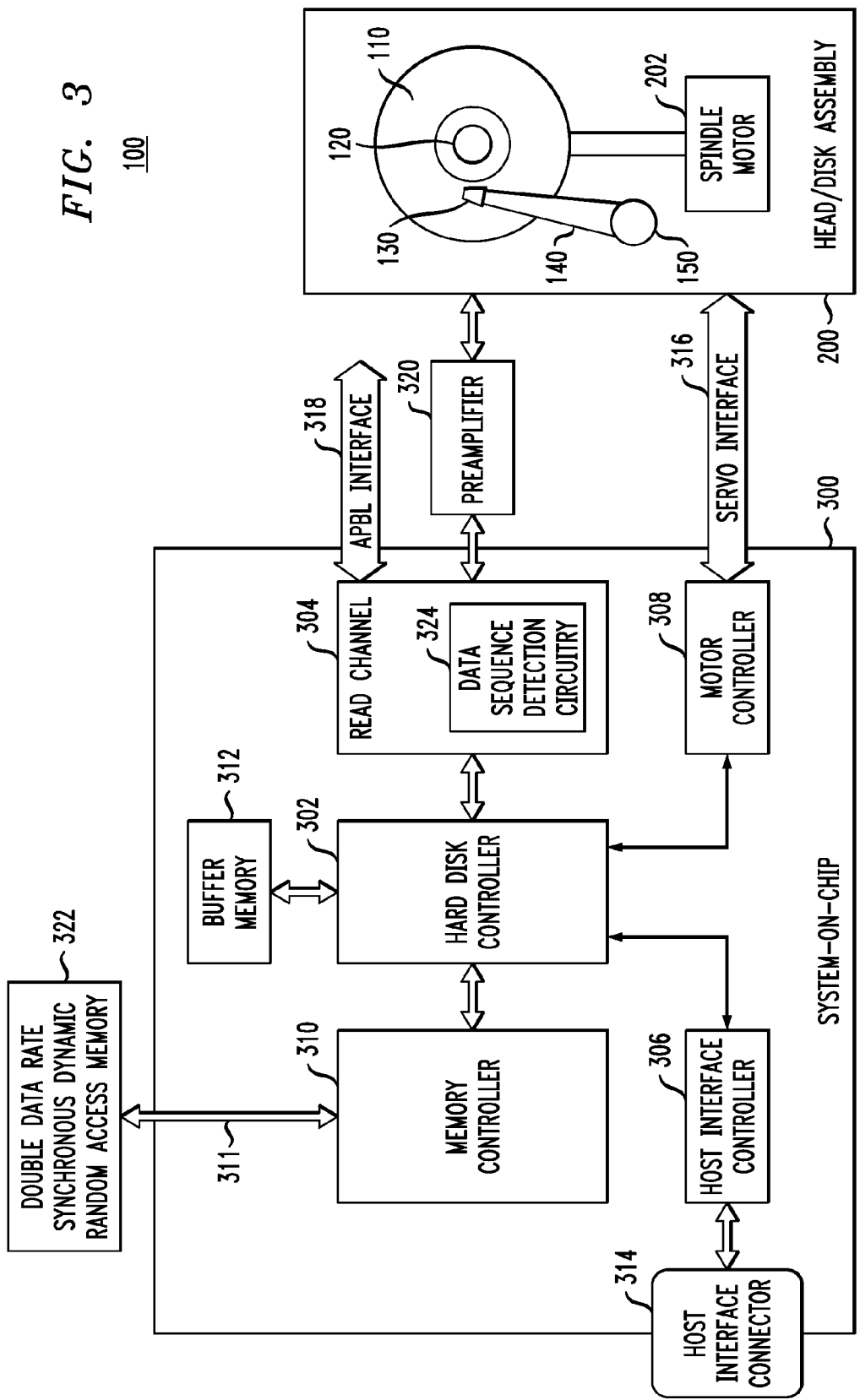
FIG. 3 schematically illustrates a storage device according to another embodiment of the invention.

FIG. 3 schematically illustrates a storage device according to another embodiment of the invention. In particular, FIG. 3 illustrates an embodiment of the storage device 100 of FIG. 1 in greater detail. As shown in FIG. 3, the storage device 100 comprises a read/write head and disk assembly 200 and a system-on-chip 300. The read/write head and disk assembly 200 comprises components such as a storage disk 110, spindle 120, read/write head 130, positioning arm 140, actuator motor 150, and a spindle motor 202, as discussed above with reference to the embodiment of FIG. 1. The system-on-chip 300 comprises various integrated circuits such as a hard disk controller 302, a read channel integrated circuit 304, a host interface controller 306, a motor controller 308, a memory controller 310, and a buffer memory 312. The system-on-chip 300 further comprises a plurality of interfaces such as a host interface connector 314, a servo interface 316, and a bidirectional APBL (Advanced Peripheral Bus-Light) interface 318. The storage device 100 further comprises a preamplifier 320 and an external random access memory 322.

The host interface connector 314 represents a physical connector (e.g., connector 180 as shown in FIG. 1) and associated input/output (I/O) bus wiring that connects the storage device 100 to a host system, device, I/O bus, or other components of a data processing system. The I/O data is moved to and from the storage device 100 through the host interface connector 314 under control of the host interface controller 306. The host interface controller 306 implements communication protocols for communicating with a host system or device and controlling and managing data I/O operations, using one or more known interface standards. For example, in one or more alternative embodiments of the invention, the host interface connector 314 and host interface controller 306 are implemented using one or more of Small Computer interface (SCSI), Serial Attached SCSI (SAS), Serial Advanced Technology Attachment (BATA) and/or Fibre Channel (FC) interface standards, for example.

The hard disk controller 302 controls the overall operations of writing and reading data to and from the storage disk 110. In one embodiment of the invention, the hard disk controller 302 is an ARM (Advanced Reduced instruction set computing Machine) In other embodiments, the hard disk controller 302 may comprise other known architectures suitable for controlling hard disk operations. The read channel integrated circuit 304 encodes and decodes data that is written to and read from the storage disk 110 using the read/write head 130. The read channel integrated circuit 304 comprises data sequence detection circuitry 324 for reproducing and detecting a digital data sequence read from the storage disk 110. The data sequence detection circuitry 324 implements circuits and methods as discussed below with reference to FIGS. 4, 5 and 6 according to embodiments of the invention. The read channel integrated circuit 304 further implements other types of circuitry that is commonly implemented to process data that is read from and written to the storage disk 110. The preamplifier 320 is connected between the read channel integrated circuit 304 and the read/write head 130. The preamplifier 320 amplifies an analog signal output from the read/write head 130 for input to the read channel integrated circuit 304 and provides a voltage bias for a magnetic sensor of the read/write head 130. The APBL interface 318 is used to access internal registers of the read channel integrated circuit 304.

The motor controller 308 is connected to the head/disk assembly 200 via the servo interface 316. The motor controller 308 sends control signals to the spindle motor 202 and actuator motor 150 through the servo interface 318 during read and write operations to spin the storage disk 110 and move the read/write head 130 into a target position. In particular, for a typical read operation, signals for performing a read operation are received through the host interface connector 316 and sent to the hard disk controller 302 through the host interface controller 306. The hard disk controller 302 processes the read signals for performing the read operation and then sends control signals to the motor controller 308 for controlling the actuator motor 150 and spindle motor 202 for the read operation. Additionally, the hard disk controller 302 sends the processed read signals to the read channel integrated circuit 304, which are then sent to the actuator motor 150 through the preamplifier 326 to perform the read operation. The actuator motor 150 positions the read/write head 130 over a target data track on storage disk 110 in response to control signals received by the motor controller 308 and the read channel integrated circuit 304. The motor controller 308 also generates control signals to drive the spindle motor 202 to spin the storage disk 110 under the direction of the hard disk controller 302. The spindle motor 202 spins the storage disk 110 at a determined spin rate.

When the read/write head 130 is positioned adjacent the target data track, magnetic signals representing data on the storage disk 110 are sensed by read/write head 130 as the storage disk 110 is rotated by the spindle motor 202. The sensed magnetic signals are provided as continuous, minute analog signals representative of the magnetic data on the storage disk 110. The analog signals are transferred from the read/write head 130 to the read channel integrated circuit 304 via the preamplifier 320. The preamplifier 320 amplifies the analog signals accessed from storage disk 110, and the read channel integrated circuit 304 decodes and digitizes the received analog signals to recreate the information originally written to the storage disk 110. The data read from the storage disk 110 is then output to a host system or device through the host interface controller 306 and host interface connector 314 under control of the hard disk controller 302.

A write operation is substantially the opposite of a read operation. For example, in one embodiment, write signals for performing write operations are received through the host interface connector 314, wherein the write signals represent commands to perform a write operation and/or data that is to be written to the storage disk 110. The write signals are sent to the hard disk controller 302 through host interface controller 306. The hard disk controller 302 processes the write signals for performing the write operation and then sends control signals to the motor controller 308 for controlling the actuator motor 150 and spindle motor 202 for the write operation. Additionally, the hard disk controller 302 sends the processed write signals (and formatted data) to the read channel integrated circuit 304, wherein the formatted data to be written is encoded. The write signals (control and data) are then sent to the actuator motor 150 through the preamplifier 320 to perform a write operation by writing data to the storage disk 110 via the read/write head 130.

In the embodiment of FIG. 3, the external random access memory 322 is an external memory relative to the system-on-chip 300 and other components of the storage device 100, but is nonetheless internal to the storage device 100. In one embodiment, the external random access memory 322 is a double data rate synchronous dynamic random access memory, although a wide variety of other types of memory may be used in alternate embodiments. The external random access memory 322 is initialized by the memory controller 310. The memory controller 310 performs signaling control of the external random access memory 322 on behalf of the hard disk controller 302, whereby initialization of the external random access memory 322 is implemented via the programming of configuration registers in the memory controller 310 by the disk controller 302. In operation, the memory controller 310 generates internal clock pulses for synchronizing data write operations and read operations of the external random access memory 322. The internal clock signals and data are transmitted to and from the external random access memory 322 via a data/signal bus 311.

In one embodiment of the invention, the external random access memory 322 serves as a buffer memory for data transfers between a host system/device and the storage device 100. For example, the read and or write signals (as discussed above) that are received by the hard disk controller 302 from the host interface controller 306 can be temporarily stored in the external random access memory 322 before being processed by the hard disk controller 302 and the read channel integrated circuit 304, for example. Moreover, data that is read out from the storage disk 110 may be temporarily stored in the external random access memory 322 before being packaged and output to a host system/device by operation of the hard disk controller 302 and the host interface controller 306. This buffering optimizes the throughput of the storage device 100 by matching disparate processing and data transmission speeds as data passes to and from the storage disk 110. The buffer memory 312 comprises on-chip memory that is used by the hard disk controller to temporarily store data and/or instructions for performing read/write operations. In one embodiment of the invention, the internal buffer memory 314 is used by the system-on-chip 300 as a buffer memory for normal functional mode operations. In one embodiment of the invention, the internal memory buffer 312 is used as a LLI (Long Latency Interface) buffer memory for normal functional mode operations of the system-on-chip 300.

It is to be understood that the external random access memory 322, system-on-chip 300 and preamplifier 320 shown in FIG. 3 collectively represent one embodiment of "control circuitry" as that term is utilized herein. Numerous alternative embodiments of "control circuitry" include a subset of the components 300, 320 and 322 or portions of one or more of these components. For example, the system-on-chip 300 itself may be viewed as an example of "control circuitry" to process data received from and supplied to the read/write head 130 and to control positioning of the read/write head 130 relative to the storage disk 110. Certain operations of the system-on-chip 300 in the storage device 100 of FIG. 3 may be directed by the disk controller 302, which executes code stored in the external random access memory 322 and/or the internal buffer memory 312, for example. Thus, at least a portion of the control functionality of the storage device 100 may be implemented at least in part in the form of software code.

Furthermore, although the embodiment of FIG. 3 illustrates various components of the system-on-chip 300 being implemented on a single integrated circuit chip, the system-on-chip 300 may include other integrated circuits, such as the external random access memory 322 or the preamplifier 320, or portions thereof. Moreover, the disk controller 302, host interface controller 306, and motor controller 308, may be implemented using suitable integrated circuit architectures such as microprocessor, digital signal processor (DSP), application-specific integrated circuit (ASIC), or field-programmable gate array (FPGA), or other types of integrated circuit architectures.

As noted above, the read channel integrated circuit 304 comprises data sequence detection circuitry 324 for reproducing and detecting a digital data sequence read from the storage disk 110. In a band limited channel, such as a read channel in a magnetic storage system, one embodiment of the data sequence detection circuitry 324 implements a multi stream approach (e.g., first and second signal processing paths P1 and P2, as shown in FIG. 5) which takes into consideration different analog-to-digital sampling phases, equalization filtering, PR (partial response) targets, and noise predictive filtering, to enable the use of diversity in the form of different residual ISI, noise components and estimations for a same sequence, to improve the data sequence detection for a baud rate system. For example, the data sequence detection circuitry 324 implements circuits and methods as discussed below with reference to FIGS. 4, 5 and 6 according to embodiments of the invention.

Figure 4:
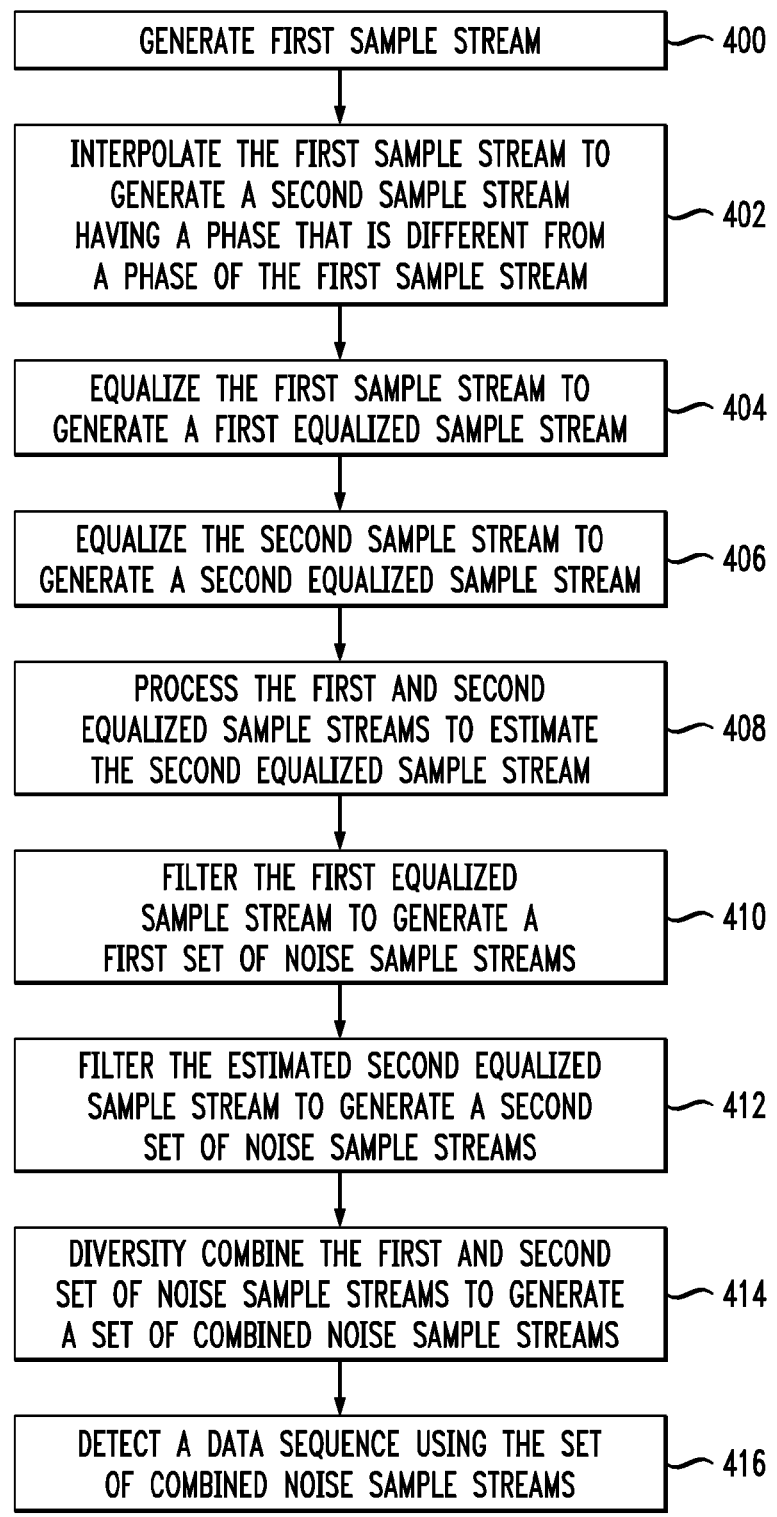
FIG. 4 illustrates a method for data sequence detection according to an embodiment of the invention.
Figure 5:
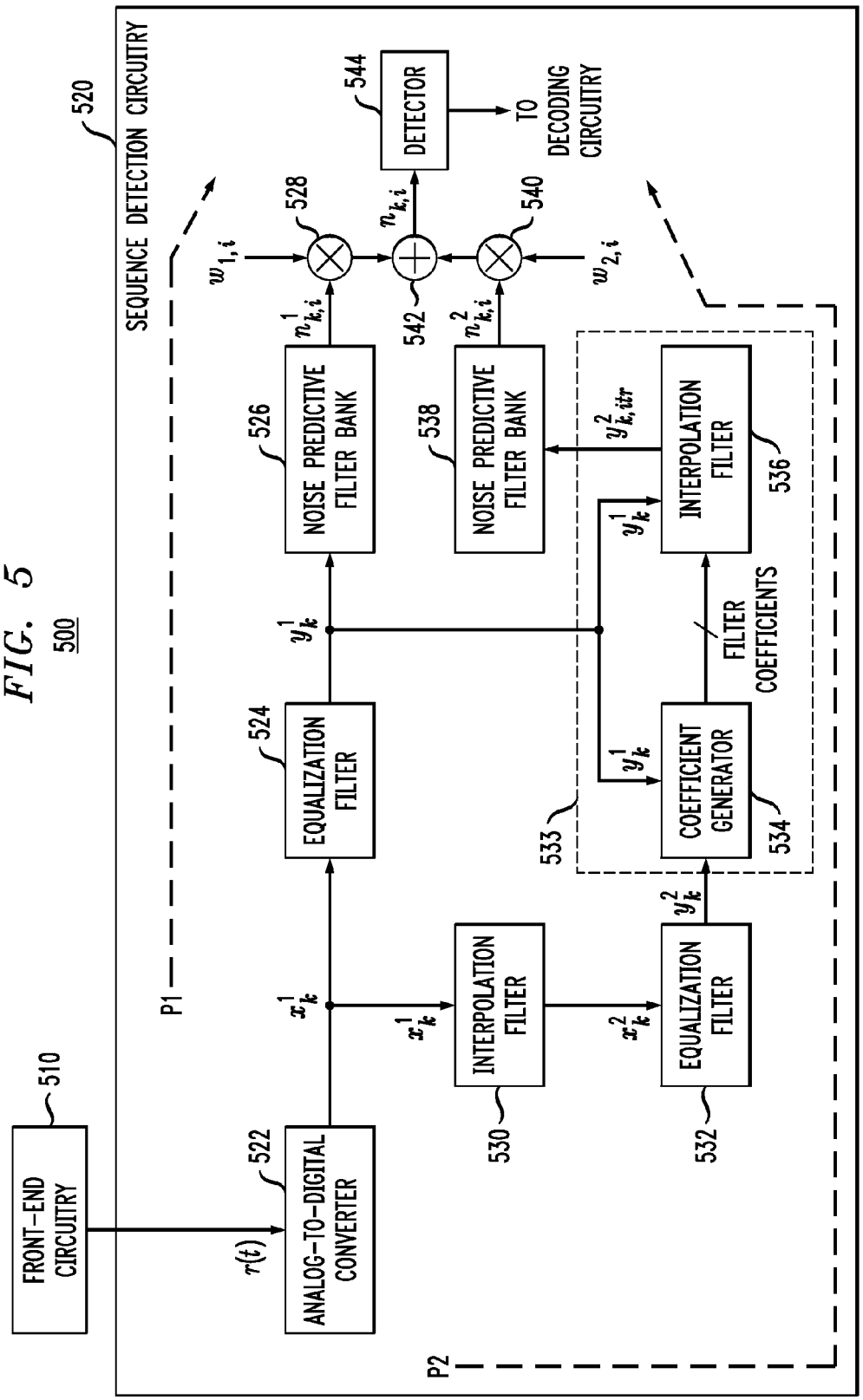
FIG. 5 is a block diagram of a circuit for reading data from a storage medium, which comprises a data sequence detection circuit according to an embodiment of the invention.

FIG. 4 illustrates a method for data sequence detection according to an embodiment of the invention. An initial step includes generating a first sample stream (block 400). The first sample stream is a time-sequenced digital signal associated with samples of an analog signal. In the context of a read channel for a storage system as shown in FIG. 3, the analog signal is an analog read channel signal containing data read from a storage disk. A next step includes interpolating the first sample stream to generate a second sample stream having a phase that is different from a phase of the first sample stream (block 402). The first sample stream is equalized to generate a first equalized sample stream (block 404). The second sample stream is equalized to generate a second equalized sample stream (block 406). The first and second equalized sample streams are processed to estimate the second equalized sample stream (block 408). In one embodiment, this process (block 408) comprises processing the first and second equalized data steams to generate an estimation filter, and using the estimation filter to estimate the second equalized sample stream by filtering the first equalized stream using the estimation filter. The first equalized sample stream is then filtered by a first bank of noise predictive filters to generate a first set of noise sample streams (block 410). The estimated second equalized sample stream is filtered by a second bank of noise predictive filters to generate a second set of noise sample streams (block 412). Thereafter, a next step includes diversity combining the first set and second set of noise sample streams to generate a set of combined noise sample streams (block 414). Finally, a data sequence is detected using the set of combined noise sample streams to generate path metrics in a maximum likelihood detector (block 416).

FIG. 5 is a block diagram of a circuit for reading data from a storage medium, which comprises a data sequence detection circuit according to an embodiment of the invention. FIG. 5 illustrates one embodiment of a circuit for implementing the method discussed above with reference to FIG. 4. In particular, FIG. 5 is a block diagram of a read channel 500 for reading data from a storage disk comprising front-end circuitry 510 and sequence detection circuitry 520. In general, the front-end circuitry 510 includes circuit components such as read head circuitry (which is part of a read/write head 130), a preamplifier (e.g., preamplifier 320, FIG. 3), a VGA (variable gain amplifier) and a continuous time filter. For a read operation, the read head and preamplifier convert data and other information stored on a storage disk into an analog read signal using known techniques. The VGA adjusts the amplitude of the analog read signal to a value that is suitable for a dynamic range of a downstream analog-to-digital converter (ADC). The continuous time filter, is a pulse-shaping filter, which serves to filter the gain-adjusted analog read signal for anti-aliasing purpose and providing proper high frequency boost, and output a filtered analog read signal, r(t). In one embodiment, the continuous time filter is a low-pass filter that filters the analog read signal before it is sampled to reduce the effects of aliasing. The VGA and continuous time filter process the analog waveform to a desired pulse amplitude and bandwidth for conversion to a digital signal.

The sequence detection circuitry 520 comprises an analog-to-digital converter 522 that receives the analog read signal r(t) from the front-end circuitry 510, and samples the analog read signal r(t) in response to a sample clock to convert the analog read signal r(t) into a digital signal. In particular, the analog-to-digital converter samples the analog read signal r(t) and generates a first sample stream, $x_k^1$, which is a time-sequenced digital signal associated with samples of the analog read signal r(t). The first sample stream, $x_k^1$, may comprise a number of samples. In one embodiment of the invention, the analog-to-digital converter 522 has a programmable sampling phase that can be selected based on an equalization target of equalization filters used in the sequence detection circuitry 520. The first sample stream, $x_k^1$, is input and processed along a plurality of signal processing paths of the sequence detection circuitry 520.

For example, in the embodiment of FIG. 5, a first signal processing path (denoted by dashed arrow P1) of the sequence detection circuitry 520 comprises an equalization filter 524, a first noise predictive filter bank 526 and a first bank of multipliers 528. A second signal processing path (denoted by dashed arrow P2) of the sequence detection circuitry 520 comprises a first interpolation filter 530, an equalization filter 532, and estimation circuitry 533 to estimate the second equalized sample stream by processing the first and second equalized sample streams, wherein the estimation circuitry 533 comprises a filter coefficient generator 534 and a second interpolation filter 536. The second signal processing path P2 further comprises a second noise predictive filter bank 538 and a second bank of multipliers 540. The sequence detection circuitry 520 further comprises a diversity combiner circuit 542 and a detector 544.

In the first signal processing path P1, the first sample stream, $x_k^1$ is input to the equalization filter 524, which equalizes the sample stream, $x_k^1$, to a specified partial response target (e.g., PR4, EPR4, E²PR4, etc.) that represents or approximates a frequency response of the read back signal of the data that is stored on the storage disk. In one embodiment, the equalization filter 524 is a digital finite impulse response filter that is configured such that the spectrum of the equalization filter output, $y_k^1$, has a shape that is similar to that of the frequency response of the partial response target. In other embodiments of the invention, other known types of equalization circuits and methods can be implemented instead of or in combination with digital finite impulse response filters to equalize the sample stream.

The equalization filter 524 generates a first equalized sample stream, $y_k^1$, which is input to the first noise predictive filter bank 526. In one embodiment, the first noise predictive filter bank 526 comprises a plurality (bank) of noise predictive finite impulse response filters, wherein each noise predictive finite impulse response filter performs noise predictive filtering on the first equalized sample stream, $y_k^1$, to yield a noise sample stream, $n_{k,i}^1$, for an $i^{th}$ data pattern, which is given by the following equation:

$$n_{k,i}^1 = \sum_{j=0}^{L-1} p_j^{1,i} \cdot y_{k-j}^1 - bias_{1,i} \quad (1)$$

In equation (1), L is a number of coefficients of each predictive filter, $p_j^{1,i}$ is the $j^{th}$ coefficient of the noise predictive filter in the first signal processing path corresponding to the $i^{th}$ data pattern, and $bias_{1,i}$ is the prediction bias. Each predictive noise sample stream $n_{k,i}^1$ in the first signal processing path P1 is input to a corresponding multiplier in the first bank of multipliers 528, where the predictive noise sample stream $n_{k,i}^1$ for each data pattern is weighted with the appropriate weight, $w_{1,i}$, to produce a weighted noise sample stream $w_{1,i} \cdot n_{k,i}^1$ for each data pattern in the first signal processing path P1.

In the second signal processing path P2, the first sample stream, $x_k^1$ is input to the first interpolation filter 530, which interpolates the sample stream $x_k^1$ by phase-shifting the sample stream $x_k^1$ by a pre-programmed phase shift amount, e.g., 0.25T, 0.5T, 0.75T, etc., where T is the period of the sample stream $x_k^1$. In one embodiment, the interpolation filter 530 generates a second sample stream $x_k^2$ having a phase shift of 0.5T away from the first sample stream, $x_k^1$.

The second sample stream $x_k^2$ is input to an equalization filter 532 which equalizes the second sample stream, $x_k^2$, to a specified partial response target (e.g., PR4, EPR4, E²PR4, etc.), and generates a second equalized sample stream, $y_k^2$. In one embodiment, the equalization filter 532 is an N-tap digital finite impulse response filter. In one embodiment, the equalization target of the equalization filter 532 is the same as the partial response target of the equalization filter 524 in the first signal processing path P1. In another embodiment, the equalization target of the equalization filter 532 is different from the partial response target of the equalization filter 524 in the first signal processing path P1.

The first equalized sample stream, $y_k^1$, and the second equalized sample stream, $y_k^2$, are input to the estimation circuitry 533 wherein the first and second equalized sample streams $y_k^1$ and $y_k^2$ are processed to generate an estimation filter and estimate the second equalized sample stream by filtering the first equalized stream using the estimation filter. More specifically, in one embodiment of the invention as shown in FIG. 5, the first and second equalized sample streams $y_k^1$ and $y_k^2$ are input to the coefficient generator circuit 534. The coefficient generator circuit 534 processes the first and second equalized sample streams, $y_k^1$ and $y_k^2$, to dynamically generate adapted filter coefficients that are applied to the second interpolation filter 536. The second interpolation filter 536 uses the adapted filter coefficients to filter the first equalized sample stream, $y_k^1$, and generate an estimated second equalized sample stream, $y_{k,itr}^2$. In other words, the second interpolation filter 536 interpolates the first equalized sample stream, $y_k^1$, to estimate the second equalized sample stream, $y_{k,itr}^2$, by filtering the first equalized sample stream, $y_k^1$, using the adapted filter coefficients. The first equalized sample stream, $y_k^1$, generated by the equalization filter 524 is buffered, and applied to the second signal processing path P2 as needed for processing by the coefficient generator 534 and the second interpolation filter 536.

Figure 6:
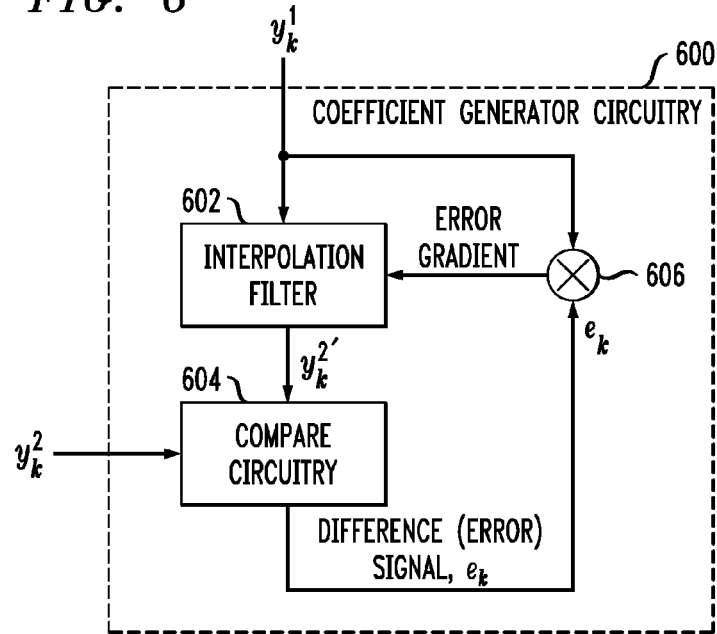
FIG. 6 is a block diagram of a coefficient generator circuit shown in FIG. 5, according to an embodiment of the invention.

FIG. 6 illustrates an embodiment of the coefficient generator circuit shown in FIG. 5. In particular, FIG. 6 is a block diagram of coefficient generator circuitry 600 according to an embodiment of the invention, which comprises an interpolation filter 602, compare circuitry 604, and a multiplier circuit 606. The interpolation filter 602 interpolates the first equalized sample stream, $y_k^1$, to an adapted equalized sample stream, $y_k^{2/}$, based on adapted coefficients that are generated by the coefficient generator circuitry 600. In one embodiment, the interpolation filter 602 is an M-tap filter that implements the following filter function:

$$y_k^{2/} = \sum_{i=0}^{M-1} f_i^{(k)} \cdot y_{k-i}^1$$

where $f_i^{(k)}$ denotes the $i^{th}$ filter coefficient at time k.

The compare circuitry 604 compares the adapted equalized sample stream, $y_k^{2/}$ output from the interpolation filter 602 with the first equalized sample stream, $y_k^1$, output from the first equalization filter 524 of the first signal processing path P1 to generate a difference signal, or error signal, $e_k = y_k^{2/} - y_k^2$. The error signal $e_k$ and the first equalized sample stream, $y_k^1$ are input to the multiplier circuit 606 and multiplied to generate error gradient data, $e_k \cdot y_{k-i}^1$. The error gradient data is applied to the interpolation filter 602 to adapt the filter coefficients of the interpolation filter 602. In one embodiment, adaptation of the filter coefficients is determined by the following function:

$$f_i^{(k+1)} = f_i^{(k)} - \alpha \cdot (e_k y_{k-i}^1)$$

where $\alpha$ denotes an update gain, which is a programmable value that can be selected to adjust the speed of adaptation. The adapted filter coefficients are applied to the interpolation filter 602 in the coefficient generator circuitry 600.

Furthermore, referring back to FIG. 5, the adapted filter coefficients are applied to the second interpolation filter 536 to filter the first equalized sample stream, $y_k^1$, and generate the estimated equalized sample stream, $y_{k,itr}^2$. With this process, the coefficient generator 534 serves as an adaptation engine to generate adapted filter coefficients that are applied to the second interpolation filter 536 to adaptively generate the estimated equalized sample stream, $y_{k,itr}^2$, which is an estimate or approximation of the second equalized sample stream, $y_k^2$.

The estimated equalized sample stream, $y_{k,itr}^2$, is input to the second noise predictive filter bank 538. In one embodiment, the second noise predictive filter bank 538 comprises a plurality (bank) of noise predictive finite impulse response filters, wherein each noise predictive finite impulse response filter performs noise predictive filtering on the estimated equalized sample stream, $y_{k,itr}^2$, to yield a noise sample stream, $n_{k,i}^2$, for the $i^{th}$ data pattern, which is given by the following equation:

$$n_{k,i}^2 = \sum_{j=0}^{L-1} p_j^{2,i} \cdot y_{k-j,itr}^2 - bias_{2,i} \quad (2)$$

In equation (2), L is number of coefficients of each predictive filter, $p_j^{2,i}$ is the $j^{th}$ coefficient of the noise predictive filter in the second signal processing path corresponding to the $i^{th}$ data pattern, and $bias_{2,i}$ is the prediction bias. Each predictive noise sample stream $n_{k,i}^2$ in the second signal processing path P2 is input to a corresponding multiplier in the second bank of multipliers 540, where the predictive noise sample stream $n_{k,i}^2$ for each data pattern is weighted with the appropriate weight, $w_{2,i}$, to produce a weighted noise sample $w_{2,i} \cdot n_{k,i}^2$ for each data pattern in the second signal processing path P2. In one embodiment of the invention, the weights for the first and second set of noise sample streams are the same, e.g., 0.5.

The first and second weighted noise sample streams $w_{1,i} \cdot n_{k,i}^1$ and $w_{2,i} \cdot n_{k,i}^2$ are input to the diversity combiner 542 where the first and second weighted noise sample streams are combined to generate composite noise sample stream $n_{k,i}$ for each data pattern. The composite noise sample stream $n_{k,i}$ is input to the detector 544 which uses digital-signal processing techniques to determine the binary bit pattern represented by the digital read signal. The detector 544 may implement one of a plurality of well-known discrete time sequence detection methods such as discrete time pulse detection (DPD), partial response (PR) with maximum likelihood detection methods. A discrete time sequence detector such as a Viterbi detector can interpret or estimate the equalized sample values in context to determine a most likely ("ML") sequence for the digital data sequence, i.e., using MLSD (Maximum Likelihood Sequence Detection), where the composite noise sample stream $n_{k,i}$ for each data pattern is used to compute a corresponding branch metric as follows:

$$bm_k^i = n_{k,i} n_{k,i} \quad (3)$$

When implementing MLSD, the detector 544 further computes the path metrics by accumulating the branch metrics of the branches in the path and finds the maximum likelihood sequence by selecting the path with the best path metric.

The detector 544 provides the binary data represented by the digital signal to decoder circuitry which removes parity bits from the binary bit pattern and performs decoding (e.g., RLL decoding) of the encoded symbols into the actual binary data. The output of the decoding circuitry provides the actual binary data to the disk controller for output to a host device.

In the embodiment of FIG. 5, diversity (the difference in signal and noise) is utilized to enhance data sequence detection. In a band limited channel, such as a read channel in magnetic storage system, a multi stream approach (e.g., first and second signal processing paths P1 and P2) implement different analog-to-digital sampling phases, equalization filtering, PR targets, and noise predictive filtering, to enable the use of diversity in the form of different residual ISI, noise components and estimations for a same sequence, to improve the data sequence detection for a baud rate system. As discussed above, in a two stream system, a first baud rate ADC sample stream $x_k^1$ is interpolated to another ADC sample stream $x_k^2$ (via the interpolation filter 530) so that the two different sample streams have a phase difference of, e.g., 0.5T. Then, an independent equalization is performed on each ADC sample stream to generate two separate equalized streams $y_k^1$ and $y_k^2$. After some optional residual distortion compensation, y-interpolator (i.e., the interpolation filter 536) is adapted based on the two equalized streams $y_k^1$ and $y_k^2$. To save die size, only the first equalized stream $y_k^1$ is saved in a y-buffer and the other estimated equalized stream $y_{k,itr}^2$, is obtained by passing the first equalized stream $y_k^1$ (in the buffer) through the y-interpolator (i.e., interpolation filter 536). The two equalized streams $y_k^1$ and $y_{k,itr}^2$, are passed to backend detector, where diversity combining is performed at the output of the noise predictive filters 526 and 538 for each equalized stream to improve the BER and SFR performance of the system.

A 2-stream detection scheme as shown in FIG. 5 is robust to channel condition variations because the read channel is sensitive to ADC sampling phases and the channel condition variations result in the optimal sampling phases change. By utilizing the diversity in two ADC sample streams with different phases, we compensate the optimal sampling phase variation introduced by channel condition variations.

Figure 7:
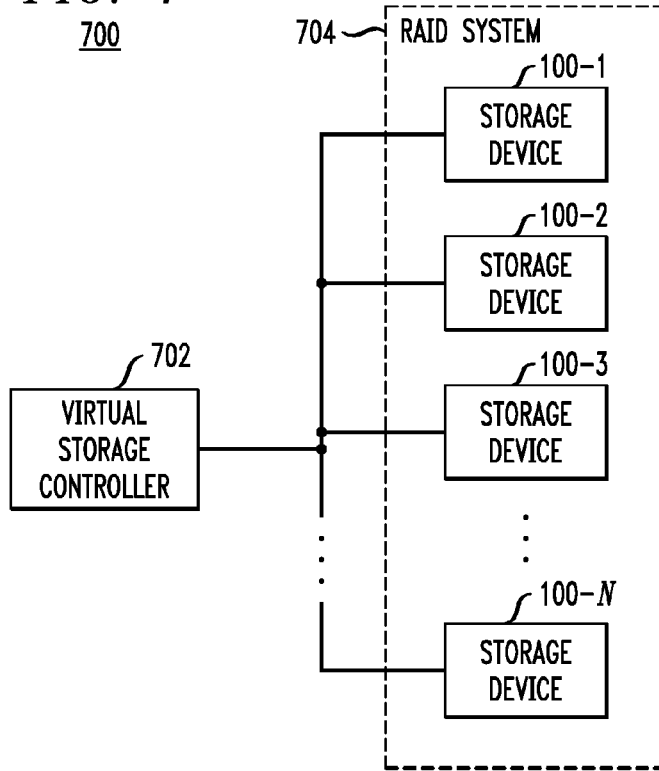
FIG. 7 shows a virtual storage system incorporating a plurality of disk-based storage devices of the type shown in FIG. 1.

Multiple disk-based storage devices 100 may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent Disks. The RAID system more specifically comprises N distinct storage devices denoted 100-1, 100-2, . . . , 100-N, one or more of which are assumed to be configured to include embodiments of a system-on-chip with an integrated circuit as shown in FIG. 5 for performing data sequence detection. These and other virtual storage systems comprising hard disk drives or other disk-based storage devices of the type disclosed herein are considered embodiments of the invention. A host processing device may also be an element of a virtual storage system, and may incorporate the virtual storage controller 702.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims.

What is claimed is:

1. A method for detecting a data sequence, comprising:
generating a first sample stream, wherein the first sample stream is a time-sequenced digital signal associated with samples of an analog signal;
interpolating the first sample stream to generate a second sample stream, wherein the second sample stream has a phase that is different from a phase of the first sample stream;
equalizing the first sample stream to generate a first equalized sample stream;
equalizing the second sample stream to generate a second equalized sample stream;
processing the first and second equalized sample streams to estimate the second equalized sample stream;
filtering the first equalized sample stream to generate a first set of noise sample streams;
filtering the estimated second equalized sample stream to generate a second set of noise sample streams;
diversity combining the first set and second set of noise sample streams to generate a set of combined noise sample streams; and
detecting a data sequence using the set of combined noise sample streams.

2. The method of claim 1, wherein the second sample stream is a phase-shifted version of the first sample stream.

3. The method of claim 1, wherein the first and second sample streams are equalized to a same equalization target.

4. The method of claim 1, wherein the first and second sample streams are equalized to a different equalization target.

5. The method of claim 1, wherein processing the first and second equalized sample streams to estimate the second equalized sample stream comprises:
processing the first and second equalized sample streams to dynamically generate filter coefficients;
filtering the first equalized sample stream using the dynamically generated filter coefficients to generate the estimated second equalized sample stream.

6. The method of claim 5, wherein processing the first and second equalized sample streams to dynamically generate filter coefficients comprises:
interpolation filtering the first equalized sample stream to generate an adapted equalized sample stream;
comparing the adapted equalized sample stream to the second equalized sample stream to generate an error signal that represents a difference between the adapted equalized sample stream and the second equalized sample stream;
weighting the error signal to generate an error gradient signal; and using the error gradient signal as a feedback signal to the interpolation filtering process to adapt filter coefficients of the interpolation filtering to generate the adapted equalized sample stream.

7. The method of claim 6, wherein weighting the error signal to generate an error gradient signal comprises using the first equalized sample stream as weight values.

8. The method of claim 1, wherein filtering the first equalized sample stream to generate a first set of noise sample streams comprises filtering the first equalized sample stream using a first noise predictive finite impulse response filter bank, wherein each noise predictive finite impulse response filter in the first noise predictive finite impulse response filter bank performs noise predictive filtering on the first equalized sample stream to yield a first noise sample stream for each data pattern;

wherein filtering the estimated second equalized sample stream to generate a second set of noise sample streams comprises filtering the estimated second equalized sample stream using a second noise predictive finite impulse response filter bank, wherein each noise predictive finite impulse response filter in the second noise predictive finite impulse response filter bank performs noise predictive filtering on the estimated second equalized sample stream to yield a second noise sample stream for each data pattern.

9. The method of claim 1, further comprising weighting the first set and the second set of noise sample streams prior to diversity combining.

10. The method of claim 1, wherein the analog signal is an analog read channel signal containing data read from a storage disk.

11. A circuit, comprising:
an analog-to-digital converter to generate a first sample stream, wherein the first sample stream is a time-sequenced digital signal associated with samples of an analog signal;
a first interpolation filter to interpolate the first sample stream and generate a second sample stream, wherein the second sample stream has a phase that is different from a phase of the first sample stream;
a first equalization filter to equalize the first sample stream and generate a first equalized sample stream;
a second equalization filter to equalize the second sample stream and generate a second equalized sample stream;
estimation circuitry to estimate the second equalized sample stream by processing the first and second equalized sample streams;
a first noise predictive filter bank to filter the first equalized sample stream and generate a first set of noise sample streams;
a second noise predictive filter bank to filter the estimated second equalized sample stream and generate a second set of noise sample streams;
a diversity combiner to combine the first set and the second set of noise sample streams and generate a set of combined noise sample streams; and
a detector to detect a data sequence using the set of combined noise sample streams.

12. The circuit of claim 11, wherein the second sample stream is a phase-shifted version of the first sample stream.

13. The circuit of claim 11, wherein the first and second sample streams are equalized to a same equalization target.

14. The circuit of claim 11, wherein the first and second sample streams are equalized to a different equalization target.

15. The circuit of claim 11, wherein the estimate circuitry comprises:
a coefficient generator circuit to process the first and second equalized sample streams and dynamically generate filter coefficients; and
a second interpolation filter to filter the first equalized sample stream using the dynamically generated filter coefficients to generate the estimated second equalized sample stream.

16. The circuit of claim 15, wherein the coefficient generator circuit comprise:
a third interpolation filter to filter the first equalized sample stream and generate an adapted equalized sample stream;
a comparing circuit to compare the adapted equalized sample stream to the second equalized sample stream to generate an error signal that represents a difference between the adapted equalized sample stream and the second equalized sample stream; and
a multiplier circuit to apply a weight to the error signal and generate an error gradient signal;
wherein the error gradient signal is feedback to the third interpolation filter to adapt filter coefficients of the third interpolation filter and generate the adapted equalized sample stream.

17. The circuit of claim 16, wherein the multiplier circuit applies the first equalized sample stream as weight values.

18. The circuit of claim 11, wherein the first and second noise predictive filter banks each comprises a noise predictive finite impulse response filter bank, wherein each noise predictive finite impulse response filter in the first noise predictive filter bank performs noise predictive filtering on the first equalized sample stream to yield a first noise sample stream for each data pattern, and wherein each noise predictive finite impulse response filter in the second noise predictive filter bank performs noise predictive filtering on the estimated second equalized sample stream to yield a second noise sample stream for each data pattern.

19. The circuit of claim 11, further comprising;
a first bank of multiplier circuits to apply first weighting values to the first set of noise sample streams; and
a second bank of multiplier circuits to applying second weighting values to the second set of noise sample streams.

20. A read channel integrated circuit comprising the circuit of claim 11, wherein the analog signal is an analog read channel signal containing data read from a storage disk.

21. A storage device comprising:
a storage medium;
a read head configured to read data from the storage medium; and
control circuitry coupled to the read head and configured to process data received from the read head;
the control circuitry comprising the circuit of claim 11.

22. A virtual storage system comprising the storage device of claim 21.

* * * * *